US012766668B2

(12) United States Patent
Tsai

(10) Patent No.: US 12,766,668 B2
(45) Date of Patent: Oct. 20, 2026

(54) SEMI-AUTOMATIC GRIP ASSEMBLY DEVICE

(71) Applicant: Shenzhen Shenshen Sports Equipment Co., Ltd, Shenzhen (CN)

(72) Inventor: Chi pen Tsai, Shenzhen (CN)

(73) Assignee: Shenzhen Shenshen Sports Equipment Co., Ltd, Shenzhen (CN)

( * ) Notice: Subject to any disclaimer, the term of this patent is extended or adjusted under 35 U.S.C. 154(b) by 381 days.

(21) Appl. No.: 18/437,070

(22) Filed: Feb. 8, 2024

(65) Prior Publication Data

US 2025/0256377 A1 Aug. 14, 2025

(51) Int. Cl.

*B25B 1/20* (2006.01)
*B25B 1/18* (2006.01)
*B25B 1/24* (2006.01)

(52) U.S. Cl.

CPC .................. *B25B 1/20* (2013.01); *B25B 1/18* (2013.01); *B25B 1/2489* (2013.01)

(58) Field of Classification Search

CPC ........... B25B 1/20; B25B 1/18; B25B 1/2489; B25B 27/026; A63B 53/14

See application file for complete search history.

(56) References Cited

U.S. PATENT DOCUMENTS 4,763,394 A * 8/1988 Decato .................... B23P 19/02 29/252
4,899,428 A * 2/1990 Hsu ......................... B25B 27/28 29/282
4,901,418 A * 2/1990 Machado ............... A63B 53/02 29/266
5,839,181 A * 11/1998 Chu ....................... A63B 60/00 29/283
5,870,815 A * 2/1999 Karner ................... A63B 53/14 29/464
6,250,168 B1 * 6/2001 D'Aguanno ........ G01M 5/0058 73/865.3
6,336,263 B1 * 1/2002 Weiss .................... B25B 27/026 29/239
6,854,170 B1 * 2/2005 D'Aguanno ........... A63B 60/42 29/239
2012/0266427 A1 * 10/2012 Holtzman ............. B25B 27/026 29/239

* cited by examiner

*Primary Examiner* — Seahee Hong

(74) *Attorney, Agent, or Firm* — JEEN IP LAW, LLC

(57) ABSTRACT

A semi-automatic grip assembly device, especially for assembling golf club grips, comprises: a machine platform; a first clamping mechanism fixed at the first end of the machine platform, which clamps the head of the golf club, to fix the club head at a predetermined position; a second clamping mechanism fixed at the middle of the machine platform; a first moving platform fixed at the second end of the machine platform opposite to the first end; a second moving platform, which is arranged on the first moving platform; wherein, a handle expansion mechanism is also provided on the second moving platform, which moves in the transverse direction to align with the opening of the grip, and moves in the longitudinal direction along with the second moving platform to be inserted into the opening of the grip and open the opening.

10 Claims, 5 Drawing Sheets

SEMI-AUTOMATIC GRIP ASSEMBLY DEVICE

TECHNICAL FIELD

The present application relates to the field of golf club assembly, and in particular to a semi-automatic grip assembly device, especially a grip for assembling golf clubs.

BACKGROUND

With the continuous improvement of people's living standards, golf is becoming more and more popular among ordinary people, and they are willing to invest more energy in participating in this sport. But if you want to play golf well, you must first have a set of high-quality golf clubs, so that you can hope to achieve good results on the course.

In recent years, all relevant manufacturers in the world have continued to increase investment in the design of golf club heads, hoping to achieve good results with excellent head designs. But the quality of a golf club doesn't just depend on the design of the head. The grip on the other end is also a very important factor.

Therefore, the assembly of the golf club grip also indirectly determines the overall quality of the golf club. Currently, in the mass production process of golf clubs, most manufacturers use manual assembly when assembling the grips. When assembling the grip, a clamp is set at one end of the table and a baffle is set at the other end. During the assembly process, first clamp the golf club in the clamp, then paste double-sided tape at the corresponding position on the end of the club, and pour an appropriate amount of lubricant box on the double-sided tape. Then push the grip onto the end of the golf club, release the clamp, and remove the golf club.

The above manual assembly has the following defects: 1) The assembly process of each assembler cannot be completely unified. During the mass production process, the quality of the clubs assembled by different assembler cannot reach a unified standard. 2) This assembly process is purely manual, and it is difficult to increase the assembly speed while ensuring quality. 3) Since the grip is set on the end of the club with an interference fit, it is difficult for the assembler to ensure that the grip is assembled in place during assembly, which will significantly affect the overall quality of the club. Purely manual assembly is not only labor-intensive and inaccurate, but also has uneven assembly quality.

In addition, although there are some so-called golf club grip assembly machines currently on the market, this type of assembly machine is only a semi-mechanical assembly machine. During the assembly process, the assembler still has to manually adjust the position of the club in the fixture of the assembly machine and the position of the grip relative to the club. This places higher demands on the quality of assembler.

SUMMARY

The present application provides a semi-automatic grip assembly device to solve at least one of the above technical problems.

In order to solve the above problems, as an aspect of the present application, a semi-automatic grip assembly device is provided, comprising: a machine platform; a first clamping mechanism fixed at a first end of the machine platform, wherein the first clamping mechanism clamps both sides of a club head of a golf club to fix the club head in a predetermined position; a second clamping mechanism fixed in a middle of the machine platform, wherein the second clamping mechanism is spaced a predetermined distance from the first clamping mechanism, and fixedly clamps a shaft of the golf club; a first moving platform fixed at a second end of the machine platform opposite to the first end, wherein a third clamping mechanism is provided on the first moving platform, and the third clamping mechanism is configured to clamp a grip of the golf club therein and be able to move back and forth in a longitudinal direction of the shaft with the first moving platform; and a second moving platform arranged on the first moving platform, wherein the second moving platform is configured to move on the first moving platform along the longitudinal direction and a transverse direction perpendicular to the longitudinal direction; wherein, a grip expansion mechanism is also provided on the second moving platform, the grip expansion mechanism is configured to move in the transverse direction to align with the opening of the grip, and moves in the longitudinal direction with the second moving platform to insert into the opening of the grip and expand the opening.

Preferably, the semi-automatic grip assembly device further comprises a controller electrically connected to the first clamping mechanism, the second clamping mechanism, the first moving platform and the second moving platform, wherein the controller is configured to set the position of the second clamping mechanism relative to the shaft and the movement amount of the first moving platform in the longitudinal direction according to preset parameters.

Preferably, the parameters comprise club length, club head angle, and grip length.

Preferably, the first clamping mechanism comprises a first bracket, a first clamping member, a second clamping member and a baffle plate, and both the first clamping member and the second clamping member are movably disposed on the first bracket, and the first clamping member and the second clamping member are movable relative to each other, wherein the club head abuts the baffle plate, and the first clamping member, the second clamping member and the baffle plate form a club head clamping space.

Preferably, the first clamping mechanism further comprises a slide rail extending in the longitudinal direction, a slide block sliding in the slide rail, and a locking piece, wherein the first bracket is fixed on the slider, the first bracket slides along the longitudinal direction with the slider in the slide rail, and is locked at the predetermined position by the locking piece when it reaches the predetermined position.

Preferably, the second clamping mechanism comprises a third clamping member, a fourth clamping member movable relative to the third clamping member, and a first driving device for driving the fourth clamping member, wherein the third clamping member and the fourth clamping member respectively form half grooves on the end surfaces facing each other, so as to form a first receiving groove between each other for accommodating the shaft when the third clamping member and the fourth clamping member clamp the shaft.

Preferably, the grip expansion mechanism comprises at least three expansion claws arranged along a circumference direction and capable of radial expansion and contraction along the circumference direction, wherein the second moving platform comprises a second driving device and an expansion claw driving device, wherein the second driving device drives the expansion claws to move back and forth in the transverse direction, and the expansion claw driving device drives the expansion claw to perform expansion and contraction movements, wherein the expansion claws are inserted into the opening of the grip when radially approaching each other, and expand the opening of the grip when radially moving away from each other.

Preferably, the third clamping mechanism further comprises a second bracket, a fifth clamping member arranged on the second bracket, a sixth clamping member movable relative to the fifth clamping member, and a third driving device for driving the fifth clamping member to move, wherein the fifth clamping member and the sixth clamping member respectively form half grooves on the end surfaces facing each other to form a second receiving groove for accommodating the grip when the fifth clamping member and the sixth clamping member clamp the grip.

Preferably, the first driving device and the second driving device are configured to be electric or pneumatic driving devices.

Preferably, a lubricant tank is provided on one side of the machine platform.

Due to the adoption of the above technical solution, this application realizes semi-automatic assembly. During assembly, you only need to stick tape on the club grip before assembly, put it into the lubricant box, and then put it on the machine to complete the assembly. In addition, the assembly device according to the present application can also set parameters according to different clubs, and is suitable for different clubs, including various wood clubs, iron-wood clubs, and iron clubs. It can assemble different types of clubs according to preset parameters, and the assembly quality is uniform.

REFERENCE SIGNS

1. Machine platform;
2. First clamping mechanism; 21. First bracket; 22. First clamping member; 23. Second clamping member; 24. Baffle plate; 25. Slide rail; 26. Slide block; 27. Locking piece;
3. Club head;
4. Second clamping mechanism; 41. Third clamping member; 42. Fourth clamping member; 43. First driving device; 44. Half groove;
5. Shaft;
6. First moving platform;
7. Third clamping mechanism; 71. Second bracket; 72. Fifth clamping member; 73. Sixth clamping member; 74. Third driving device;
8. Grip;
9. Second moving platform; 91. Second driving device; 92. Expansion claw driving device;
10. Grip expansion mechanism; 101. Expansion claw;
11. Controller;
12. Lubricant tank;
L. Longitudinal direction;
Q. Transverse direction;
M. Club head clamping space;
U. Circumferential direction;
W1. First receiving groove;
W2. Second receiving groove.

DESCRIPTION OF EMBODIMENTS

Embodiments of the present application will be described in detail below in conjunction with the accompanying drawings.

Embodiments of the present application are described below through specific examples, and those skilled in the art can easily understand other advantages and effects of the present application from the contents disclosed in this specification. Apparently, the described embodiments are only some of the embodiments of the present application, not all of them. The present application can also be implemented or applied through different specific implementation modes, and various modifications or changes can be made to the details in this specification based on different viewpoints and applications without departing from the spirit of the present application. It should be noted that, in the case of no conflict, the following embodiments and features in the embodiments can be combined with each other. Based on the embodiments in the present application, all other embodiments obtained by persons of ordinary skill in the art without making creative efforts belong to the protection scope of the present application.

Figure 1:
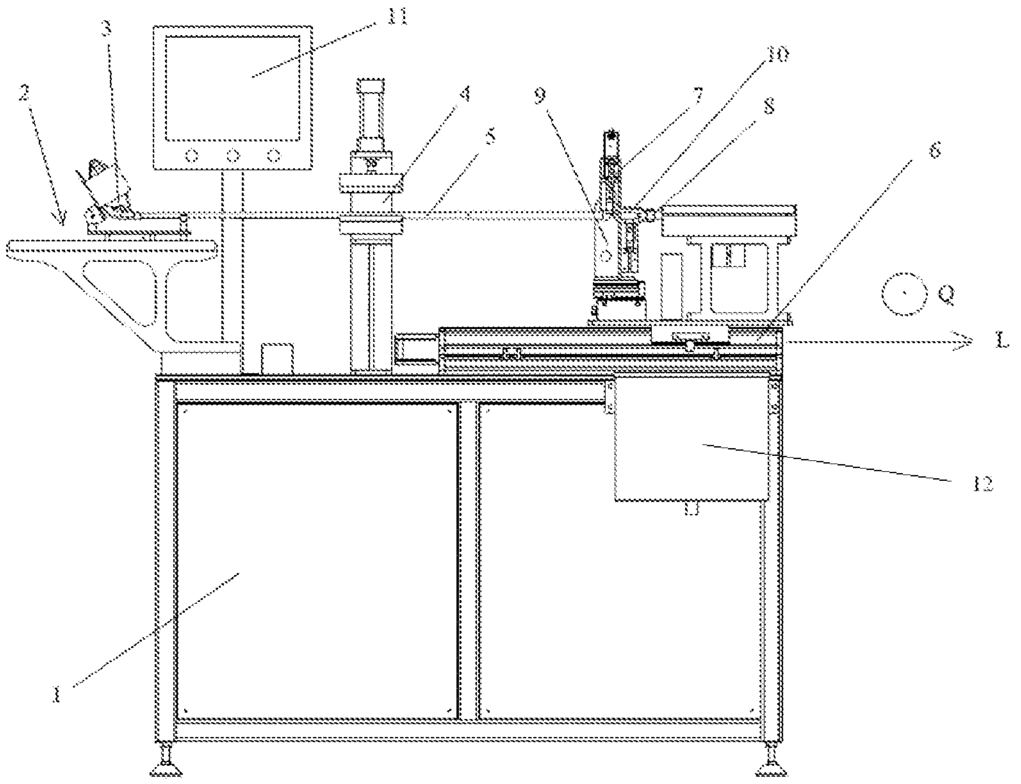
FIG. 1 is a schematic diagram of a semi-automatic grip assembly device according to the present application.

Referring to FIG. 1, this application provides a semi-automatic grip assembly device suitable for small workshops, such as golf equipment repair centers on golf courses, which comprises: a machine platform 1; a first clamping mechanism 2 fixed at a first end of the machine platform 1, wherein the first clamping mechanism 2 clamps both sides of a club head 3 of a golf club to fix the club head 3 in a predetermined position; a second clamping mechanism 4 fixed in a middle of the machine platform 1, wherein the second clamping mechanism 4 is spaced a predetermined distance from the first clamping mechanism 2, and fixedly clamps a shaft 5 of the golf club; a first moving platform 6 fixed at a second end of the machine platform 1 opposite to the first end, wherein a third clamping mechanism 7 is provided on the first moving platform 6, and the third clamping mechanism 7 is configured to clamp a grip 8 of the golf club therein and be able to move back and forth in a longitudinal direction L of the shaft 4 along with the first moving platform 6; and a second moving platform 9 arranged on the first moving platform 6, wherein the second moving platform 9 is configured to move on the first moving platform 6 along the longitudinal direction L and a transverse direction Q perpendicular to the longitudinal direction L; wherein, a grip expansion mechanism is also provided on the second moving platform, the grip expansion mechanism 10 is configured to move in the transverse direction Q to align with the opening of the grip 8, and moves in the longitudinal direction L with the second moving platform 9 to insert into the opening of the grip 8 and expand the opening.

In addition, it can be further seen from FIG. 1 that the semi-automatic grip assembly device further comprises a controller 11 electrically connected to the first clamping mechanism 2, the second clamping mechanism 4, the first moving platform 6 and the second moving platform 9, wherein the controller 11 is configured to set the position of the second clamping mechanism 4 relative to the shaft 5 and the movement amount of the first moving platform 6 in the longitudinal direction L according to preset parameters. In this embodiment, the controller 11 is not electrically connected to the first clamping mechanism 2. In actual operation, the operator needs to manually adjust the position of the first clamping mechanism 2 relative to the club head. In an alternative technical solution, the first clamping mechanism 2 can be controlled by the controller 11.

Preferably, the parameters comprise club length, club head angle, and grip length. In the specific solution of this application, the above parameters can be input into the controller 11 in advance. Alternatively, the above parameters can also be entered manually on site before each assembly.

Figure 2:
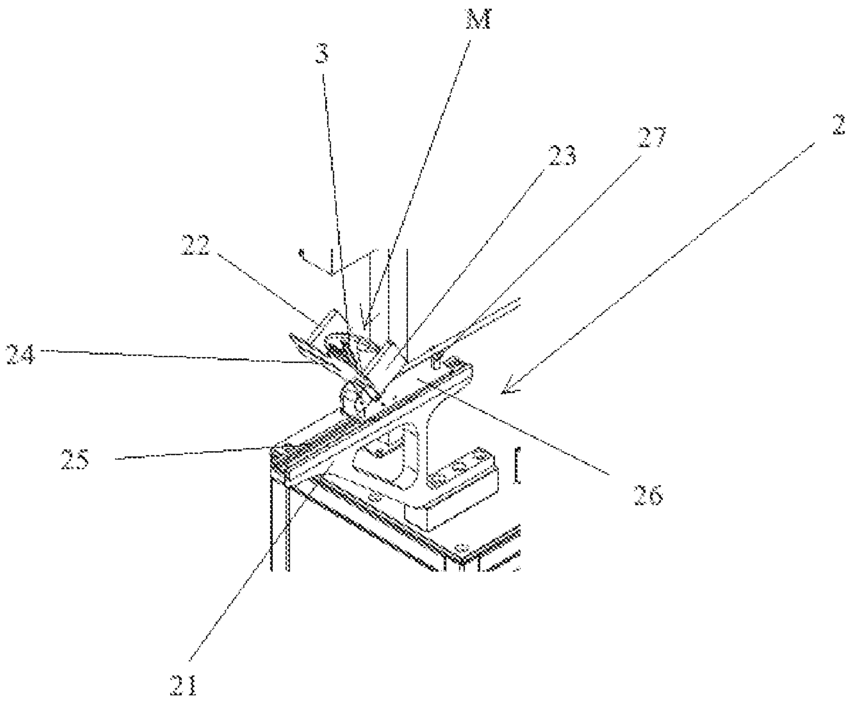
FIG. 2 is a schematic diagram of the first clamping mechanism of the semi-automatic grip assembly device according to the present application.

FIG. 2 shows a schematic diagram of the first clamping mechanism of the semi-automatic grip assembly device according to the present application. As can be seen from the figure, the first clamping mechanism 2 comprises a first bracket 21, a first clamping member 22, a second clamping member 23 and a baffle plate 24, and both the first clamping member 22 and the second clamping member 23 are movably disposed on the first bracket 21, and the first clamping member 22 and the second clamping member 23 are movable relative to each other, wherein the club head 3 abuts the baffle plate 24, and the first clamping member 22, the second clamping member 23 and the baffle plate form a club head clamping space.

In a preferred technical solution, the first clamping mechanism 2 further comprises a slide rail 25 extending in the longitudinal direction L, a slide block 25 sliding in the slide rail 26, and a locking piece 27, wherein the first bracket 21 is fixed on the slider 26, the first bracket 21 slides along the longitudinal direction L with the slider 26 in the slide rail 26, and is locked at the predetermined position by the locking piece 27 when it reaches the predetermined position.

Figure 3:
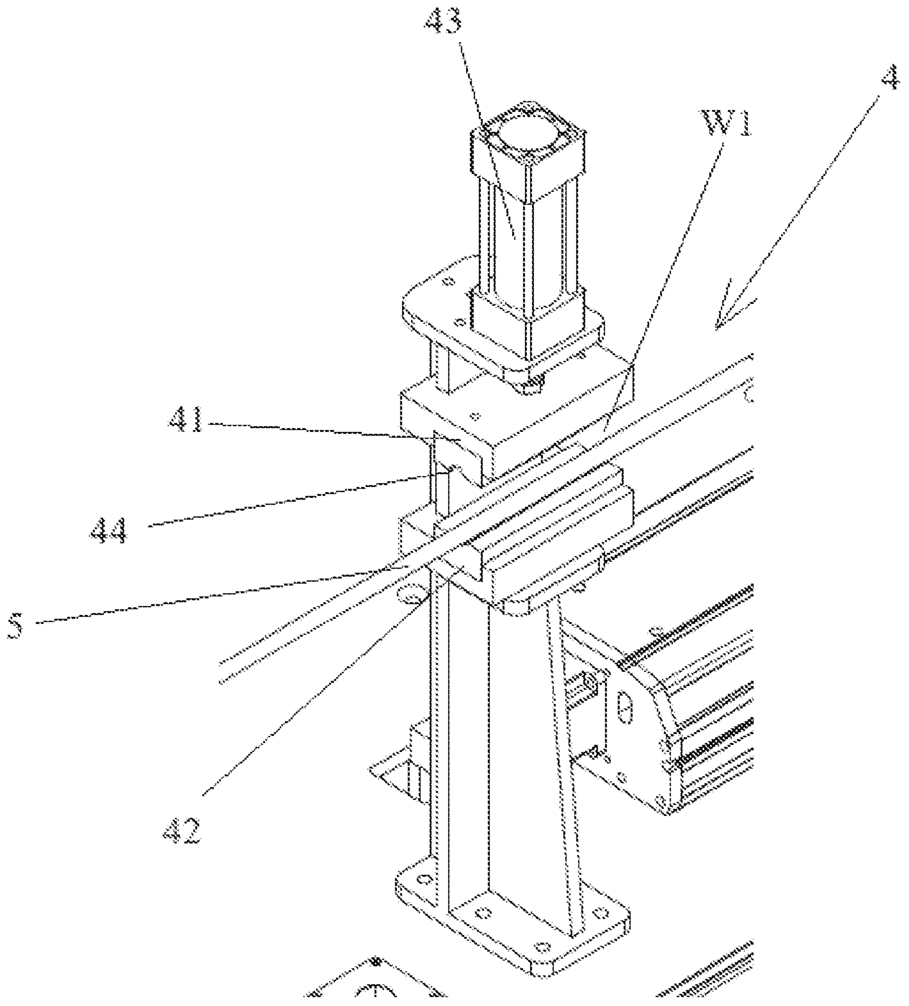
FIG. 3 is a schematic diagram of the second clamping mechanism of the semi-automatic grip assembly device according to the present application.

FIG. 3 shows a schematic diagram of the second clamping mechanism of the semi-automatic grip assembly device according to the present application. As can be seen from the figure, the second clamping mechanism 4 comprises a third clamping member 41, a fourth clamping member 42 movable relative to the third clamping member 41, and a first driving device 43 for driving the fourth clamping member 42, wherein the third clamping member 41 and the fourth clamping member 42 respectively form half grooves 44 on the end surfaces facing each other, so as to form a first receiving groove W1 between each other for accommodating the shaft 5 when the third clamping member 41 and the fourth clamping member 42 clamp the shaft 5.

Figure 4:
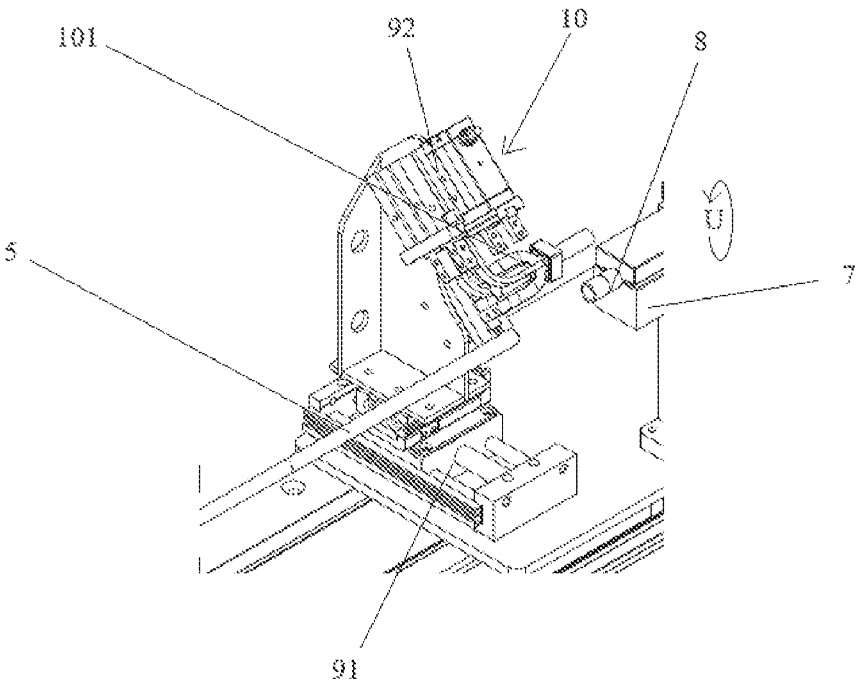
FIG. 4 is a schematic diagram of the grip expansion mechanism of the semi-automatic grip assembly device according to the present application.

FIG. 4 shows a schematic diagram of the grip expansion mechanism of the semi-automatic grip assembly device according to the present application. As can be seen from the figure, the handle expansion mechanism 10 comprises at least three expansion claws 101 arranged along the circumference direction and capable of radial expansion and contraction along circumference direction U, wherein the second moving platform 9 comprises a second driving device 91 and an expansion claw driving device 92, wherein the second driving device drives the expansion claws to move back and forth in the transverse direction, and the expansion claw driving device drives the expansion claw to perform expansion and contraction movements, wherein the expansion claws 101 are inserted into the opening of the grip 8 when radially approaching each other, and expand the opening of the grip 8 when radially moving away from each other. Only three expansion claws 101 are shown in FIG. 4, but the designer can set two, four or more expansion claws as needed.

Figure 5:
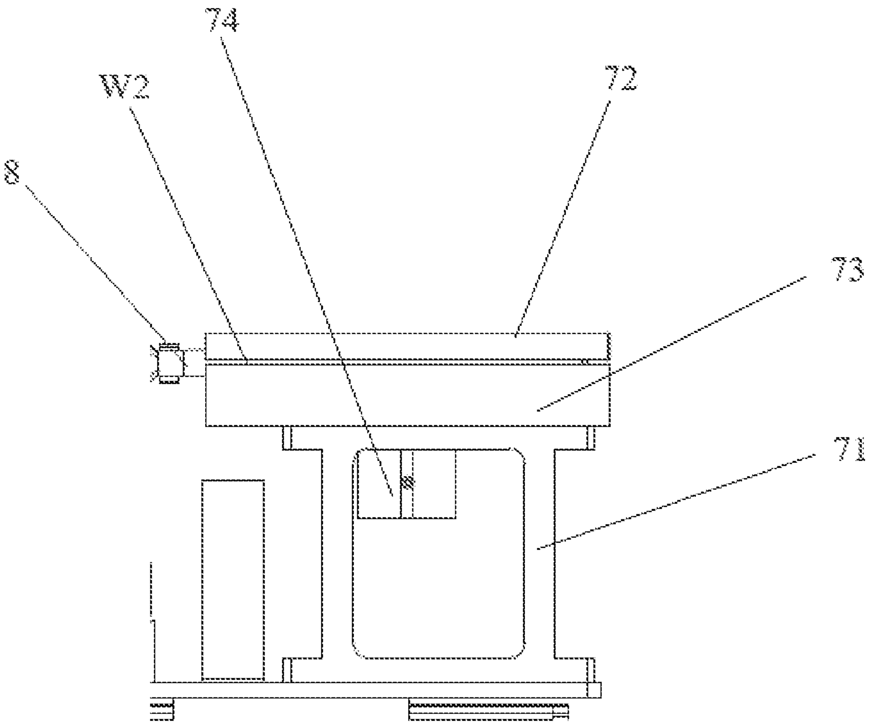
FIG. 5 is a schematic diagram of a third clamping mechanism of the semi-automatic grip assembly device according to the present application.

FIG. 5 shows a schematic diagram of the third clamping mechanism of the semi-automatic grip assembly device according to the present application. As can be seen from the figure, the third clamping mechanism 7 further comprises a second bracket 71, a fifth clamping member 72 arranged on the second bracket 71, a sixth clamping member 73 movable relative to the fifth clamping member 72, and a third driving device 74 for driving the fifth clamping member 72 to move, wherein the fifth clamping member 72 and the sixth clamping member 73 respectively form half grooves (not shown in the figure) on the end surfaces facing each other to form a second receiving groove W2 for accommodating the grip when the fifth clamping member and the sixth clamping member clamp the grip.

In a preferred technical solution of the present application, the first driving device, the second driving device, the third driving device and the expansion claw driving device are designed as pneumatic driving devices. However, these drives can also be designed as electric drives.

In addition, as shown in FIG. 1, a lubricant tank 12 is also provided on the side of the machine platform 1. Preferably, the lubricant tank contains Tenna water.

When assembling, select the specific model of the club to be assembled (such as a No. 7 iron) on the operation interface of the controller 11, and the specific parameters corresponding to the specific model, such as club length, club head angle, and club grip length, etc. are stored in the controller 11 in advance. The controller 11 will automatically set the feed amount of the first moving platform 5 on the right side of the machine platform 24 (i.e. the depth of the club inserted into the club grip) based on these parameters. In a preferred technical solution, the controller 11 will also preferably adjust the clamping force of the first clamping mechanism 2 on the golf club, because the diameters of golf clubs of different models are different.

Before assembly, the worker pastes tape on the corresponding position of the unassembled grip 8, and immerses the club with the tape on it into the Tianna water in the lubricant box, to use the Tianna water to temporarily remove the stickiness of the tape, so that the club can be easily pushed into the grip. After the Tianna water evaporates, the adhesive tape regains its stickiness. Then, place the club on machine platform 1. At this time, the club head 3 is placed into the head clamping space M formed by the first clamping member 22, the second clamping member 23 and the baffle plate 24. After the club head 3 is clamped and fixed by the first clamping member 22 and the second clamping member 23, it tightly abuts against the baffle plate 24. Then place the grip 8 into the third clamping mechanism 7 on the right side. At this time, the operator presses the start switch, causing the third clamping member 42 and the fourth clamping member 43 of the second clamping mechanism 4 to clamp the golf club shaft 5, and at the same time, the third clamping member 42 of the third clamping mechanism 7 clamps the golf club shaft 5. The fifth clamping part 72 and the sixth clamping part 73 clamp the handle 8. Then, the second driving device 91 arranged on the second moving platform 9 drives the expansion claws 101 to move in the transverse direction Q toward the shaft 5. After the expansion claws 101 are aligned with the opening of the grip 8, the expansion claw driving device 92 drives the expansion claws 101 to insert into the opening and expand the opening (larger than the diameter of the club). Then, the first moving platform 6 moves in the longitudinal direction L toward the direction of the club head 3 so that the end of the shaft 5 is inserted into the grip 8. After reaching the predetermined feed amount, the expansion claw driving device 92 drives the expansion claw 101 to withdraw from the opening, and the second driving device drives the expansion claw 101 to move away from the shaft 5 in the transverse direction Q. After the above action is completed, the second clamping mechanism 4 releases the shaft 5, thereby completing the assembly.

Due to the adoption of the above technical solution, this application achieves semi-automatic assembly. It only needs to be pasted with tape on the club grip before assembly, put it into the lubricant box, and then put it on the machine platform to complete the assembly. It can also set parameters according to different clubs, and is suitable for different clubs, including various woods, iron-woods, and irons. It can assemble different types of clubs according to preset parameters, and the assembly quality is uniform.

The above is only to illustrate the implementation of the application, and is not intended to limit the application. For those skilled in the art, any modification, equivalent replacement, improvement, etc. within the spirit and principles of the application without creative work shall be included in the protection scope of the application.

What is claimed is:

1. A semi-automatic grip assembly device, comprising:
- a machine platform;
- a first clamping mechanism fixed at a first end of the machine platform, wherein the first clamping mechanism clamps both sides of a club head of a golf club to fix the club head in a predetermined position;
- a second clamping mechanism fixed in a middle of the machine platform, wherein the second clamping mechanism is spaced a predetermined distance from the first clamping mechanism, and fixedly clamps a shaft of the golf club;
- a first moving platform fixed at a second end of the machine platform opposite to the first end, wherein a third clamping mechanism is provided on the first moving platform, and the third clamping mechanism is configured to clamp a grip of the golf club therein and be able to move back and forth in a longitudinal direction of the shaft with the first moving platform; and
- a second moving platform arranged on the first moving platform, wherein the second moving platform is configured to move on the first moving platform along the longitudinal direction and a transverse direction perpendicular to the longitudinal direction;
- wherein a grip expansion mechanism is also provided on the second moving platform, the grip expansion mechanism is configured to move in the transverse direction to align with an opening of the grip, and moves in the longitudinal direction with the second moving platform to insert into the opening of the grip and expand the opening.

2. The semi-automatic grip assembly device according to claim 1, wherein the semi-automatic grip assembly device further comprises a controller electrically connected to the first clamping mechanism, the second clamping mechanism, the first moving platform and the second moving platform, wherein the controller is configured to set the position of the second clamping mechanism relative to the shaft and the movement amount of the first moving platform in the longitudinal direction according to preset parameters.

3. The semi-automatic grip assembly device according to claim 2, wherein the parameters comprise club length, club head angle, and grip length.

4. The semi-automatic grip assembly device according to claim 1, wherein the first clamping mechanism comprises a first bracket, a first clamping member, a second clamping member and a baffle plate, and both the first clamping member and the second clamping member are movably disposed on the first bracket, and the first clamping member and the second clamping member are movable relative to each other, wherein the club head abuts the baffle plate, and the first clamping member, the second clamping member and the baffle plate form a club head clamping space.

5. The semi-automatic grip assembly device according to claim 4, wherein the first clamping mechanism further comprises a slide rail extending in the longitudinal direction, a slide block sliding in the slide rail, and a locking piece, wherein the first bracket is fixed on the slide block, the first bracket slides along the longitudinal direction with the slide block in the slide rail, and the first bracket is locked at the predetermined position by the locking piece when the slide block reaches the predetermined position.

6. The semi-automatic grip assembly device according to claim 1, wherein the second clamping mechanism comprises a third clamping member, a fourth clamping member movable relative to the third clamping member, and a first driving device for driving the fourth clamping member, wherein the third clamping member and the fourth clamping member respectively form half grooves on the end surfaces facing each other, so as to form a first receiving groove between each other for accommodating the shaft when the third clamping member and the fourth clamping member clamp the shaft.

7. The semi-automatic grip assembly device according to claim 6, wherein the grip expansion mechanism comprises at least three expansion claws arranged along the circumference direction and capable of radial expansion and contraction along the circumference direction, wherein the second moving platform comprises a second driving device and an expansion claw driving device, wherein the second driving device drives the expansion claws to move back and forth in the transverse direction, and the expansion claw driving device drives the expansion claws to perform expansion and contraction movements, wherein the expansion claws are inserted into the opening of the grip when radially approaching each other, and expand the opening of the grip when radially moving away from each other.

8. The semi-automatic grip assembly device according to claim 7, wherein the third clamping mechanism further comprises a second bracket, a fifth clamping member arranged on the second bracket, a sixth clamping member movable relative to the fifth clamping member, and a third driving device for driving the fifth clamping member to move, wherein the fifth clamping member and the sixth clamping member respectively form half grooves on the end surfaces facing each other to form a second receiving groove for accommodating the grip when the fifth clamping member and the sixth clamping member clamp the grip.

9. The semi-automatic grip assembly device according to claim 8, wherein the first driving device and the second driving device are configured to be electric or pneumatic driving devices.

10. The semi-automatic grip assembly device according to claim 1, wherein a lubricant tank is provided on one side of the machine platform.

* * * * *